(12) United States Patent
Moore et al.

(10) Patent No.: US 6,263,936 B1
(45) Date of Patent: Jul. 24, 2001

(54) TECHNIQUE FOR MAKING FIBER COMPOSITE OBJECT

(75) Inventors: Robert A. Moore, Burleson; Ronald J. Measom, Hurst, both of TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 0 days.

(21) Appl. No.: 09/370,392

(22) Filed: Aug. 6, 1999

(51) Int. Cl.[7] .............................. B32B 31/00; D04H 1/64
(52) U.S. Cl. .............................. 156/361; 156/60; 156/64; 156/349; 156/441
(58) Field of Search ............................ 156/60, 64, 349, 156/361, 441

(56) References Cited

U.S. PATENT DOCUMENTS

| | | | |
|---|---|---|---|
| 4,123,212 | 10/1978 | Piazza | 425/82.1 |
| 4,562,033 | * 12/1985 | Johnson et al. | |
| 4,696,707 | 9/1987 | Lewis et al. | 156/64 |
| 4,750,965 | 6/1988 | Pippel et al. | 156/361 |
| 5,022,952 | 6/1991 | Vaniglia | 156/441 |
| 5,841,892 | 11/1998 | McGrath et al. | 382/141 |
| 5,871,604 | 2/1999 | Hohman | 156/62.8 |

OTHER PUBLICATIONS

"Design Automation of V–22 Grip", by Robert A. Moore, Bell Helicopter Textron, Inc., presented at the American Helicopter Society 50th Annual Forum, Washington, D.C., May 11–13, 1994.

* cited by examiner

*Primary Examiner*—Richard Weisberger
(74) *Attorney, Agent, or Firm*—Kenneth C. Hill; Melvin A. Hunn

(57) ABSTRACT

A complex object, such as a spar for a tilt-rotor aircraft rotor blade, is manufactured from fiber composite materials. Unbroken fiber strips are laid along the length of the spar to maximize the number of full length fibers used in the spar. Cross-sectional areas along the length of the spar can change in both shape and area. The fibers are laid to accommodate and form these variable shapes. The locations for the fibers are determined by defining locations for the strips for each cross-section, then connecting corresponding points together to specify where the strips are to be laid down.

14 Claims, 4 Drawing Sheets

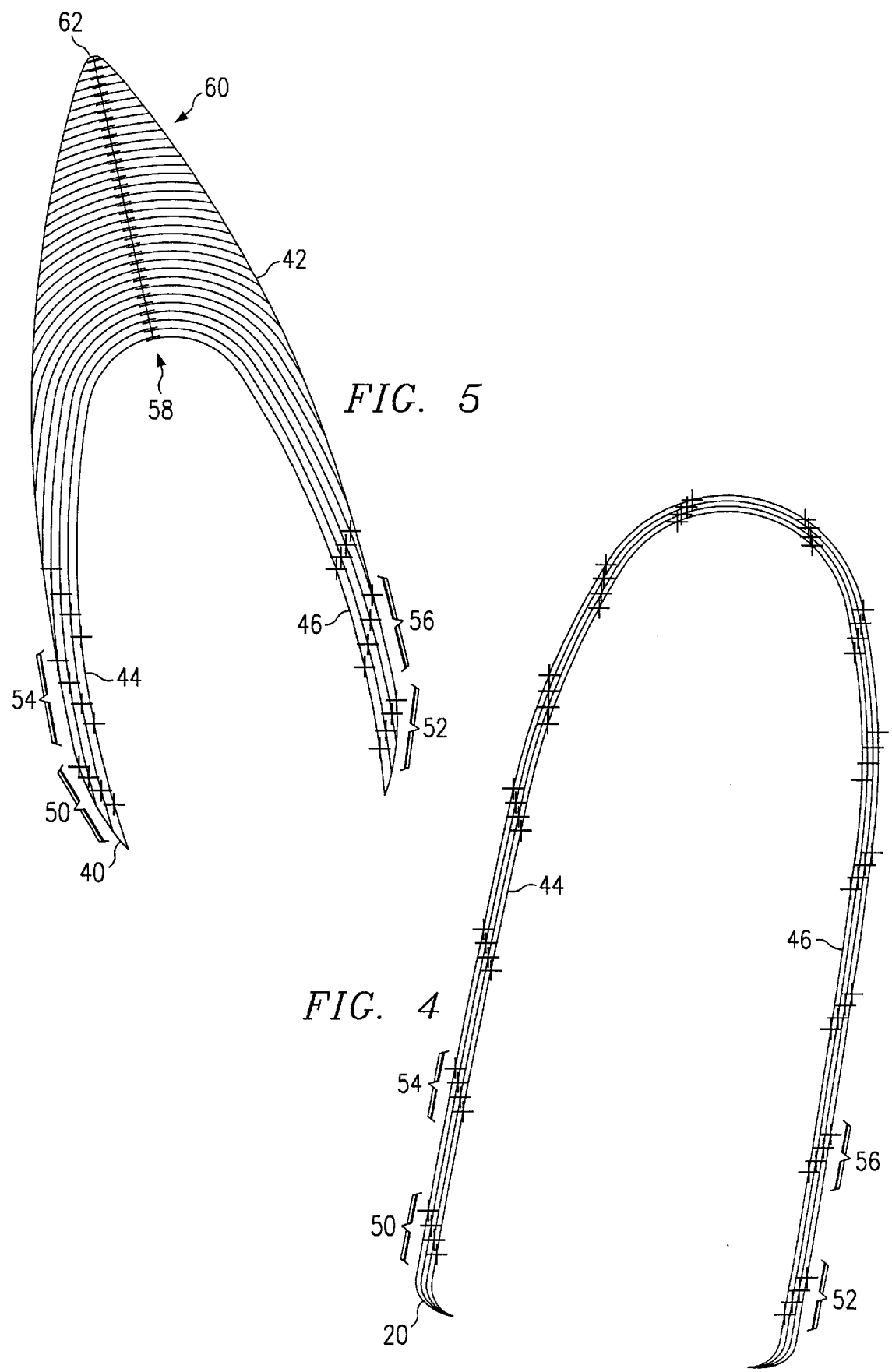

TECHNIQUE FOR MAKING FIBER COMPOSITE OBJECT

BACKGROUND ART

1. Field of the Invention

The present invention relates generally to the fabrication of objects using fiber composite materials, and more specifically a technique for forming an object, such as a portion of a rotor blade for an aircraft, having a cross-sectional shape which varies along its length.

2. Description of Prior Art

Because of considerations such as weight and strength, fiber composite materials are seeing increasing use in high-tech structures, such as aircraft parts. They are seeing increasing use in aircraft parts such as air foils, rotor blades, and similar parts.

The design of some parts is fairly complex, and results in structures which are not easily fabricated. An example of such a structure are blade components for a helicopter rotor or aircraft propeller. Such blades often have a primary load bearing structure, typically fabricated along the leading edge of the blade. Such a structure is referred to herein as a spar. For some aircraft types, in particular helicopter rotors and rotors for tilt-rotor aircraft, the shape of the spar is relatively complex.

For example, a spar for a tilt-rotor aircraft rotor blade may be on the order of fifteen to thirty feet in length. Along the length of the spar, the cross-sectional area changes, as well as the shape of each cross-section. In addition, the spar includes a twist for aerodynamic purposes.

Numerous techniques are available for fabricating spars using fiber composite materials, but prior art techniques are not always suitable to state-of-the-art objects. For example, one technique for fabricating a spar for a tilt-rotor aircraft blade involves formation of the object in two pieces. A top half and a bottom half are each separately formed on a shaped mold, and then coupled together on another shaped mold. Attaching the two pieces together typically involves deformation of the two originally molded halves. Such techniques tend to be expensive both in terms of assembly time and labor, and in tooling to make the product.

To enhance strength and stiffness of the product, it is desirable that as many fibers as possible be laid full length along the spar. Because of the complex nature of the spar shape, this can be difficult using prior art techniques.

It would be desirable to provide a technique, and the resulting product, for manufacturing complex shapes such as rotor spars for tilt-rotor aircraft rotor blades. It would be desirable for the technique to be relatively inexpensive in both manufacturing and tooling costs, and to provide an accurate reproduction of an intended complex shape.

BRIEF SUMMARY OF THE INVENTION

Therefore, in accordance with the present invention, a complex object, such as a spar for a tilt-rotor aircraft rotor blade, is manufactured from fiber composite materials. Unbroken fiber strips are laid along the length of the spar to maximize the number of full length fibers used in the spar. Cross-sectional areas along the length of the spar can change in both shape and area. The fibers are laid to accommodate and form these variable shapes. The locations for the fibers are determined by defining locations for the strips for each cross-section, then connecting corresponding points together to specify where the strips are to be laid down.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 4 is a close up view of a single cross-section;

FIG. 5 is a close up view of another single cross-section;

DETAILED DESCRIPTION OF THE PREFERRED EMBODIMENT

The following description illustrates application of the technique of the present invention to form a rotor blade component for a tilt-rotor aircraft. This blade component, referred to herein as a spar, has a relatively complex shape which is accomplished using the techniques of the invention. It will be appreciated by those skilled in the art that many other parts, having differing complex shapes, may be manufactured using the techniques described below.

Figure 1:
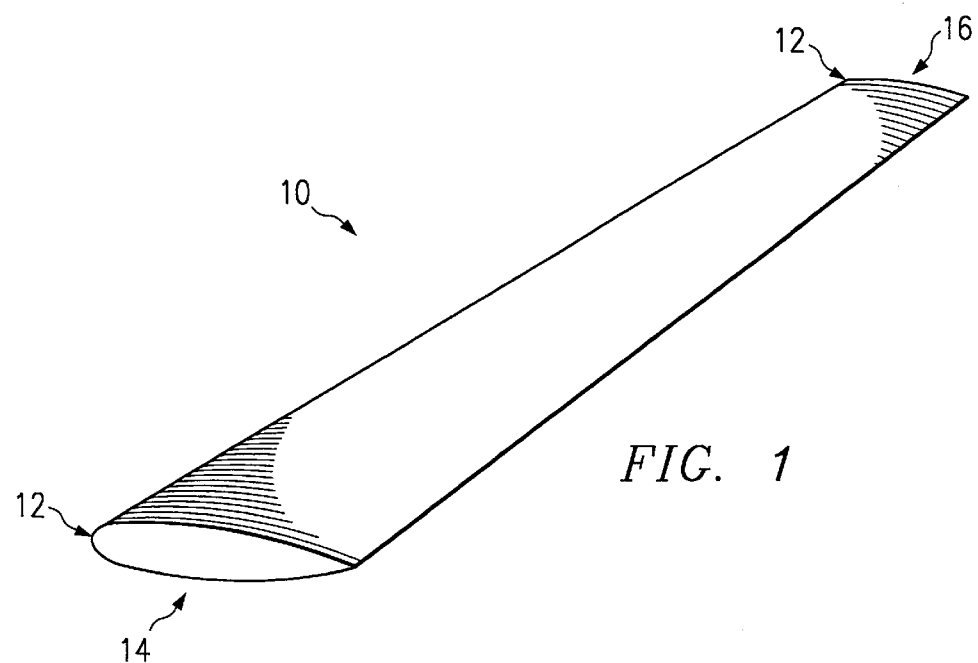
FIG. 1 is a perspective view of an aircraft rotor blade.

FIG. 1 shows an aerodynamic blade 10 suitable for use as, for example, a rotor blade on a tilt-rotor aircraft. Similar blades can be used on helicopters and other aircraft. As is known in the art, a load bearing portion of the blade 12, forming the leading edge, is manufactured to provide the primary strength and stiffness for the blade. For purposes of the present description, the load bearing component of the blade will be referred to as a spar, used as a rotor blade component for a tilt-rotor aircraft rotor blade.

As can be seen in FIG. 1, the spar 12 extends generally from a root end 14 to a tip end 16 of the blade. The outer surface of the blade 10 is smooth and shaped aerodynamically according to the requirements of the aircraft on which it is used. As is typical with blades of this type, but not illustrated in FIG. 1, the blade not only changes size and shape as one moves from the root to the tip, but includes a twist to more efficiently generate lift.

Fabrication of such blades can be extremely expensive and complex. In particular, the load bearing spar 12 is an expensive critical component. With increasing use of fiber composite materials in formation of such spars, more complex shapes are possible. This allows a spar to be better configured to match the demands of the aircraft for which it is used.

Figure 2:
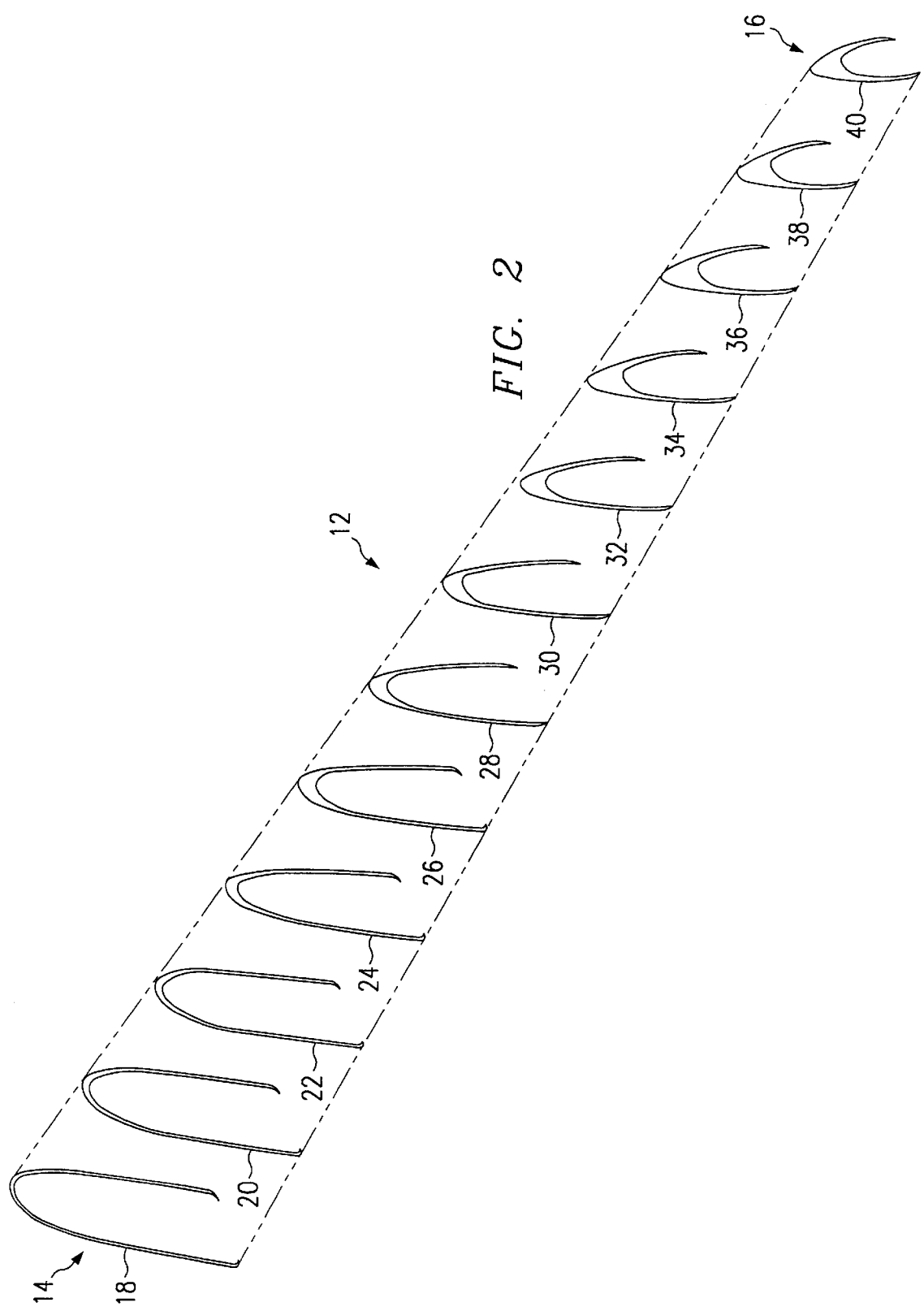
FIG. 2 is a cross-sectional view of a rotor blade spar including selected cross-sections thereof.

FIG. 2 is a line drawing of a spar 12 useful in a tilt-rotor aircraft rotor blade. In the drawing of FIG. 2, several cross-sections 18–40 are provided for the spar 12. From these cross-sections, several characteristics of the spar 12 are easily seen.

One feature clearly shown in FIG. 2 is that the spar 12 is not solid throughout its cross-section. Instead, for weight and strength considerations, the spar is hollow. It is typically "D" shaped, and designed to provide the leading edge of the rotor blade as well as primary support for the rest of the blade. It can also be easily seen from the cross-sections of FIG. 2 that the shapes of the various cross-sections 18–40, along the length of the spar, are not the same. In this spar 12, near the root end 14 the cross-sections have a relatively constant thickness. In contrast, near the tip end 16, the cross-sections have a greater volume along the leading edge of the spar.

The spar 12 of the preferred embodiment conforms to several engineering design rules. One rule relevant to the present invention is that the cross-sectional area of the spar never increases as one moves from the root toward the tip. Thus, the volume of material required to form the tip end of the spar is less than that required at the root end. In the context of the preferred embodiment, the term "cross-sectional area" means the cross-sectional area of the spar in which material is found; the hollow, enclosed interior region of the spar is not counted as part of the cross-sectional area.

Figure 3:
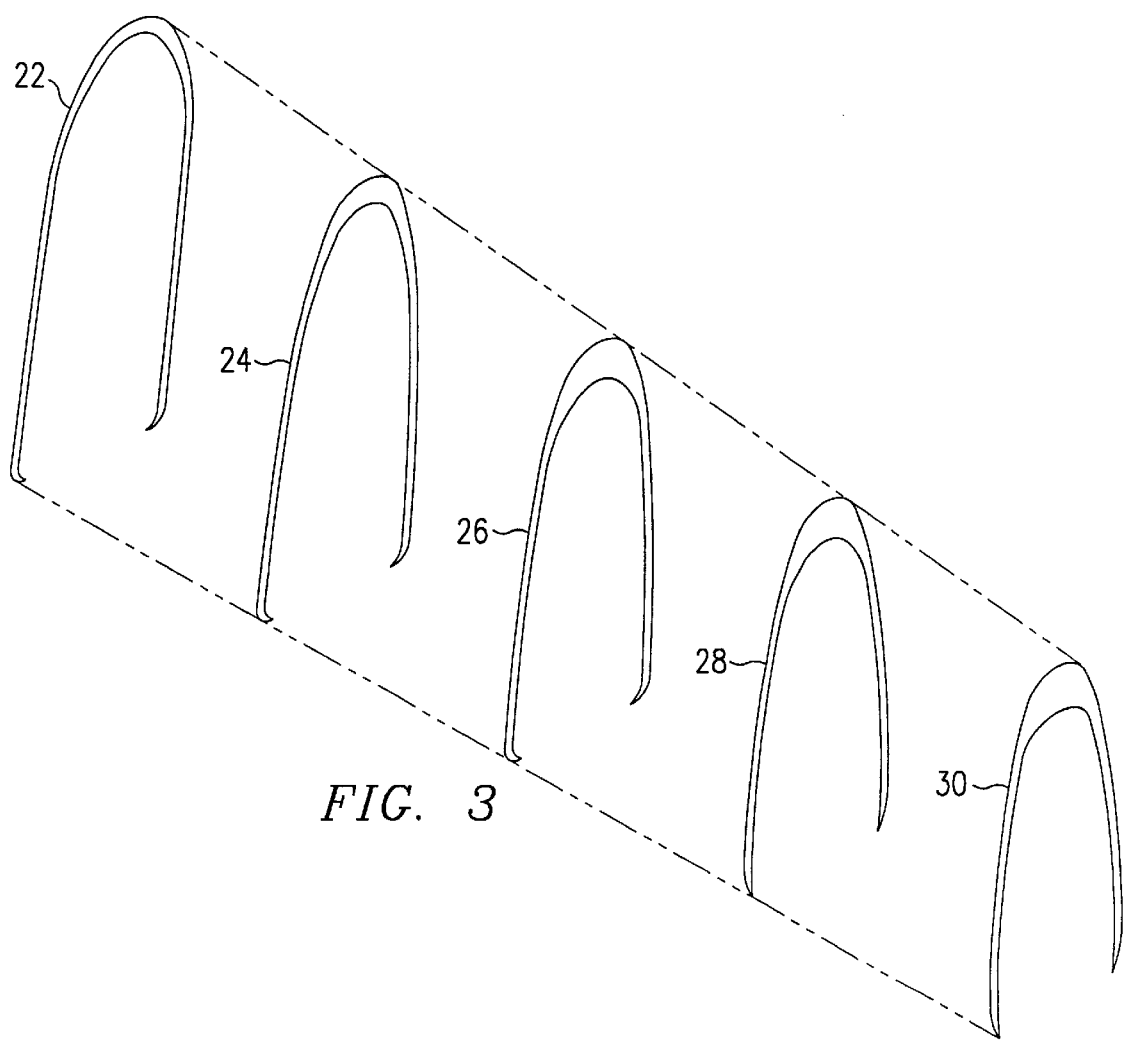
FIG. 3 is a close up view of several of the cross-sections of FIG. 2.

FIG. 3 is an enlarged view of five of the cross-sections 22–30 from FIG. 2. As seen in FIG. 3, the thickness of the spar along the top and bottom surfaces are substantially constant. In the Figures, the spar 12 is oriented so that the upper surface is to the right, and the lower surface is to the left. As the spar gets shorter in the direction from the leading edge to the trailing edge, the amount of material required at the leading edge increases. Thus, the amount of material at the leading edge of the first cross-section shown in FIG. 3 is essentially the same as along the top and bottom surfaces, while that shown in the fifth cross-section of FIG. 3 is significantly greater.

FIGS. 4 and 5, considered together, illustrate this feature further. FIGS. 4 and 5 are not drawn to the same scale, with FIG. 4 actually being approximately twice as tall as FIG. 5. As can be seen from a comparison of these two figures, the cross-sectional area of the spar, at the location where the FIG. 4 cross-section 20 was taken, has approximately the same thickness throughout. In contrast, at the cross-section 40 of FIG. 5, the spar has a greatly enlarged leading edge 42 in order to meet aerodynamic design criteria. In these two figures, the top and bottom surfaces 46 and 44, respectively, of the spar 12 have substantially the same thickness.

A preferred technique for manufacturing the desired structure will now be described in detail. The preferred method will be described in conjunction with its use on a Viper 1200 Fiber Placement Machine available from Cincinnati. However, the same technique can be used on any other machine which has the capabilities described below.

The spar is formed on a tool which has a shape conforming to the interior, hollow shape of the finished spar. The top and bottom faces of the spar, and its leading edge, are formed on the tooling in their final configuration. The trailing edge of the spar is open at the time it is formed on the tooling, and will be closed and sealed after the spar has been removed from the tool. The trailing edge of spar 12 is generally approximately perpendicular to a chord of the spar extending from the leading edge to the trailing edge of the blade.

Initially, a layer of fiber material, such as fiberglass, is laid down over the tool. This layer has a constant thickness over the working surface of the tool. Next comes the laying down of a layer, in accordance with the present invention, which defines the volume and shape of the spar.

Preferably, fiberglass strips are individually laid down along the length of the spar. As used in the Viper 1200 machine described above, these strips can be up to one and one-half inches wide, in increments of one-eighth inch. Each strip has a thickness of 0.018 inches. Layering these strips on top of each other defines a volume proportional to the number of fiber strips laid down.

The goal in laying down the fiber strips is to maximize the number of full length strips used to build up the spar. This maximizes the strength and stiffness of the resulting spar. Also, it is preferable to maximize the width of each strip where possible. Thus, a single strip having a width of one and one-half inches is preferable to two strips having a combined width of one and one-half inches. In addition, a single strip of having a length of ten feet along the spar is preferable to two separate strips having a total length of ten feet.

In accordance with the method of the preferred embodiment, the strips are laid down one at a time over the tool and underlying layer, beginning at the root of the spar along the trailing edge. The manner in which the strips are initially laid down is most clearly seen with respect to cross-section 20 of FIG. 4. In FIG. 4, each of the tick marks 50–56, and the remaining unnumbered tick marks, indicates a point at which the middle of a strip passes through that cross-section. The strips are laid down sequentially from the open (trailing) edge of the cross-section, progressing toward the leading edge.

One preferred order for laying down the fiber strips is as follows. Four strips are laid down together at the trailing edge of the lower surface, to form the required thickness at tick marks 50. The next four strips are laid down at the trailing edge of the upper surface at tick marks 52. Then, four strips are laid down adjacent to the first four strips, toward the leading edge at tick marks 54, followed by four strips at tick marks 56. This alternating pattern continues until all strips are laid down in their defined locations.

Other patterns for laying down the strips can be used. Depending on the particular application, some patterns may be suitable while others are not. Another useful pattern is to start at the leading edge, first laying strips down in groups of four as described above. The pattern of laying down strips then progresses back toward the trailing edges of the upper and lower surfaces, preferably alternating in a manner similar to that previously described. Other patterns may be useful, and will become apparent to those skilled in the art.

Referring to FIG. 5, a cross-section 40 taken near the tip of the spar shows the effect of the strips migrating toward the leading edge. Here, as in FIG. 4, the strips begin at 1½ inches in width. Because the spar is much shorter near the tip, in the direction from the leading edge to the trailing edge, only approximately three rows of strips are needed to define the upper and lower surfaces 46,44 of the spar. The remaining strips are stacked on the leading edge to provide the extra volume required there. As illustrated in FIG. 5, a large number of strips are stacked on the leading edge to define its required shape.

The first strips 58 applied to the leading edge are approximately 1½ inches wide, but later strips 60 become narrower. Near the front of the leading edge 62, they become very small. In the preferred embodiment, strips can become as small as the ⅛ inch minimum width which the equipment is capable of providing.

To define the locations of the strips, it is necessary to determine the volume of the spar at various locations. This is accomplished through determining the cross-sectional area of the various cross-sections. FIGS. 4 and 5 illustrate these determinations.

Starting with the cross-sections of the spar provided by those responsible for designing it, a set of offset curves is placed on each cross-section. The curves represent the thickness of the shape-defining layer. Individual layers of fiber strips will be used to build up to the required thickness. These layers are shown in FIGS. 4 and 5, and the thickness of the layers represented by the curves corresponds to the thickness of the fiber strips. The number of curves needed to fill the volume of the shape defining layer depends, of course, on the thickness of the shape defining layer at various locations. The embodiment shown requires four layers of fiber strips for the upper and lower surfaces. Placing the curves on the cross-sections is easily accomplished using suitable CAD software as known in the art.

Each cross-section is then considered individually, and the fiber strips located. As shown in FIGS. 4 and 5, tick marks are placed using the CAD software to designate the locations of the center lines of the fiber strips.

Finally, once the center points are located for each cross-section, it is necessary to connect corresponding points on the cross-sections. One point from each cross-section defines a single fiber strip, and points are taken sequentially from each cross-section to define the locations of the various fiber strips used to form the shape defining layer. Because the next available point is used to define each strip, the strips tend to migrate to the leading edge near the tip of the spar.

Figure 6:
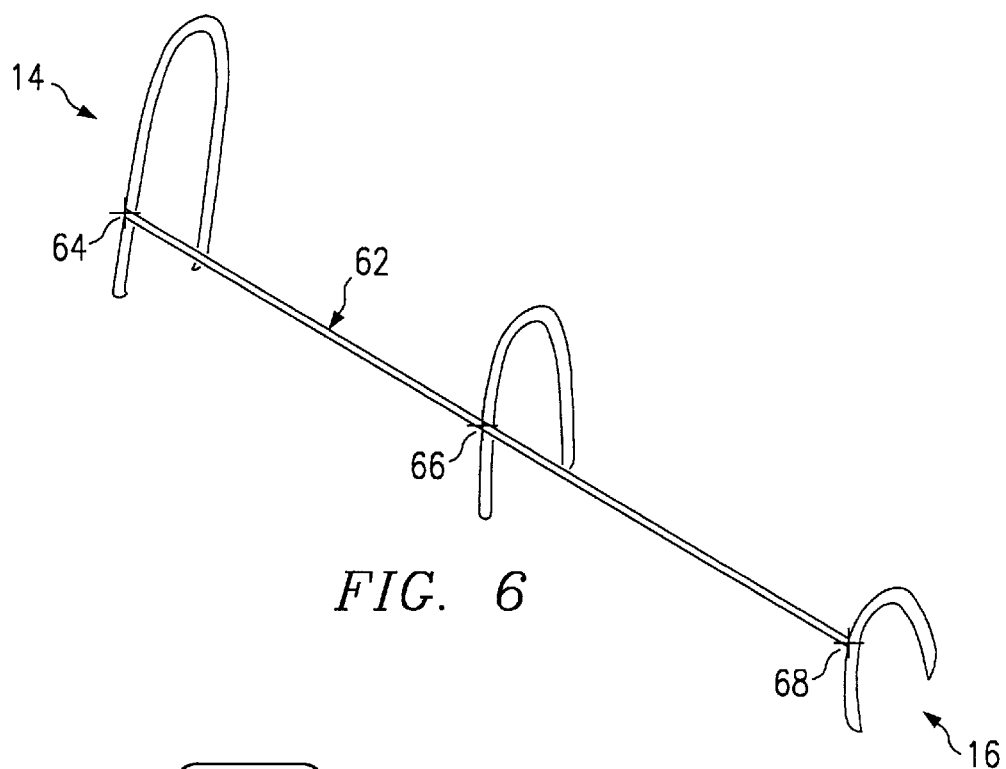
FIG. 6 is a view of several cross-sections showing the placement of a single fiber strip along the spar.

FIG. 6 illustrates how a single strip 62 migrates from the lower surface to the leading edge of the spar. This is illustrative of the manner in which all of the strips which end up on the leading edge are laid down. Near the root end 14 of the spar, the strip forms part of the lower surface, with its centerline at point 64. Approximately midway down the length of the spar, the same strip 62 still forms part of the lower surface, as shown by the centerline at point 66.

However, near the tip of the spar, the length of the spar from the leading to the trailing edge is much shorter. By this time, the strip 62 is applied to the leading edge, the upper and lower surfaces near the tip having already been completed. In three space, the strip tends to form a portion of a helix as it is laid down from the root toward the tip.

In most cases, the area of the cross-sections near the tip are less than that near the root of the spar. This is accomplished by having the last strips laid down not extend the full length of the spar. Thus, the first course of strips laid down will extend the full length of the spar, but the last course will end somewhere short of the tip. The exact length of the later strips depends on the specification for the cross-sectional area near the tip.

The cross-sectional areas near the tip are also lessened by narrowing the width of the strips being laid down. The combination of some narrower strips near the tip of the spar, along with the lesser number of strips which extend to the tip, provides a cross-sectional area less than that near the root.

Once all of the strips are laid down in accordance with the present invention, additional layers of constant thickness are preferably formed on top of the described shape defining layers. These outer layers provide a finished surface for the spar. Once the spar has been completely formed on the tool, it is removed and closed at the trailing edge as known in the art. Later, it is cured and attached to the remainder of the blade as known in the art.

The steps of the method are preferably performed on a general purpose digital computer. Any of several CAD programs widely available, such as ICAD, available from Knowledge Technologies International, are suitable when programmed to perform the process described above. Program code to calculate and define the locations for the fiber strips, in accordance with the following description, is used in conjunction with the CAD system to generate code suitable for use by the numerical controller in the fiber placement machine. The generated code drives the fiber placement machine to automatically and reproducibly place the fiber strips in the correct locations.

Figure 7:
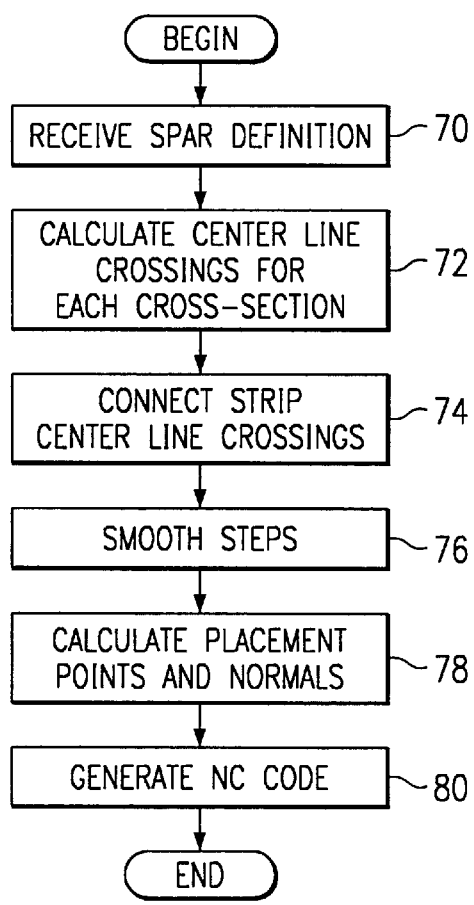
FIG. 7 is a flowchart illustrating a preferred computerized method for defining the commands to control an automated fiber placement machine to manufacture the preferred spar.

The steps to be performed on the computer to implement the preferred method are relatively straightforward, and are illustrated in FIG. 7. Initially, a definition of the spar is generated and received by the software 70. Generation of such definitions in three dimensional CAD systems is well known in the art and does not form part of the inventive method. The definition of the spar contains numerous cross-sections of the spar at various locations. These cross-sections are sufficient to completely define the spar in three dimensions.

Once the definition of the spar has been received, the method of the preferred embodiment calculates the center line crossings of the fiber strips for each cross-section in the spar definition 72. This calculation involves laying out the strips in adjacent rows as described above. The number of courses of strips to be laid depends on the thickness of the shape definition layer as described above. This calculation can be made using the capabilities of any appropriate CAD system.

In general, this procedure considers each fiber strip in sequence, beginning from the trailing edge of the top and bottom surfaces. Given the area to be filled for each cross-section, and the area of the strip, the strip can be placed in the needed location through a simple automated procedure. The cross-sectional area of each strip is simply the product of their thickness and width. Once the required location of the strips has been determined for one cross-section, the procedure is repeated for the remaining cross-sections.

Once all strip centerlines have been placed on all cross-sections, the centerlines for each strip are connected together across the cross-sections 74. This provides the location of the strip along the face of the spar. Corresponding locations on each cross-section are defined to be for a single strip. Thus, the first strip defined can be, for example, for the inside layer using the centerlines closest to the trailing edge of the upper surface. The second strip defined would then be for the corresponding portion of the lower surface. The next strip to be defined is for the second set of centerlines along the trailing edge of the upper surface, followed by the corresponding points for the lower surface. In this manner, all sets of centerline crossings are connected together to define the strips to be used.

As the tip of the spar is approached, less centerline crossings will be required to fill up the space of the required cross-section. This means that one or more strips stop short of the cross-section under consideration. The strip is simply cut short at the last point for which it has a defined centerline crossing.

In the preferred embodiment, the fiber strips will be moved in a somewhat stepwise manner when their centerlines are laid out. The step size is the same as the width of the strip, in the present example 1½ inches. This means that the initial calculation of strip centerlines can result in a sharp step of 1½ inches between cross-sections—which may be only a fraction of an inch apart. These steps must be smoothed out, so that a gradual movement occurs of the tape centerline toward the leading edge of the spar. Using any general spline procedure, available in the CAD program, the centerline is recalculated to be a smooth best fit curve connecting the crossings of the spar cross-sections 76.

A series of centerline crossing locations in space, used for a single fiber strip, is calculated 78 as a set of points to be reached by the fiber placement machine while feeding a continuous band of fiber. In order that the fiber strip is not twisted with respect to the surface of the spar, it is necessary to calculate 78 and provide a normal vector for each crossing point. Using this vector, the controller orients the strip dispenser head so that the fiber strip is laid flat against the previously laid layers of the spar.

At this time, a set of instructions is generated to drive the controller of the fiber strip dispenser 80. The information available includes all of the strip centerline crossing points. At each point, the location and orientation (defined by the normal vector) of each point are known. The sequence of points used to define each strip are identified. Finally, the width of the strip at each point is known. This data is presented as a file to the controller so that it can apply the fiber strips as known in the art. The format to be used for this file depends on the format expected by the controller, and is known to those skilled in the art.

Variations on the described technique will become apparent to those skilled in the art. For example, the preferred embodiment is described in conjunction with design rules that provide for a never increasing cross-sectional area as one moves from the root to the tip of the spar. However, the technique can easily be used with designs which don't meet this rule. If both ends of the resulting product have a larger cross-sectional area than the middle, fibers can be laid from both ends toward the middle. If the cross-sectional area increases and decreases several times, shorter fiber strips will be needed, and will be laid down from a starting point elsewhere than one of the ends.

This approach may be required if, for example, weights or other materials are required to be placed into the spar during or after fabrication. The ideal is for only full length fibers to be used, but coming as close as possible to this goal will generally maximize the important physical properties of the spar.

Other variations can be used if the fiber placement equipment is capable of handling them. For example, if the equipment is capable of laying down different thicknesses of fiber strips, this can be accounted for when the original strip placement is made. However, the same general approach as described above can be used.

In general, the preferred technique comprises the method of defining points, such as centerline points for each fiber strip, on a plurality of cross-sections of a complex shape. Enough points are defined for each cross-section to fill up the required cross-sectional area for that section. The points for the various cross-sections are then combined into sets, one per cross-section, to define fiber strips to be placed. These sets of points are then provided to the controller for the fiber placement machine, which then forms the shape under automatic control.

The resulting structure is formed from as many full length and full width fibers as possible, giving maximum strength and stiffness. The individual fiber strips wind as necessary across the face of the shape to fill the defined volumes. This allows shapes to be created that cannot be easily formed, or not formed at all, using prior art techniques.

The preferred technique results in tooling and fabrication costs which are significantly less than are attainable using prior art techniques. This makes improved complex shapes commercially affordable, enhancing the performance of products made using them.

Although a preferred embodiment has been described in detail, it will be understood by those skilled in the art the scope of the invention is defined by the appended claims.

We claim:

1. A method for forming a composite fiber object, comprising the steps of:
   selecting a plurality of cross-sections defining the object;
   defining a plurality of points on each cross-section as placement points;
   grouping sets of placement points, one point per cross section, each set defining a position for a single prepreg fiber strip; and
   applying prepreg fiber strips to the object in accordance with the groups, wherein each strip is applied at a position determined by one of the grouped sets of points.

2. The method of claim 1, wherein all of the prepreg fiber strips have the same width and the same thickness.

3. The method of claim 1, wherein a first prepreg fiber strip has a width less than a second prepreg fiber strip.

4. The method of claim 1, wherein at least one prepreg fiber strip has a length less than a length of the object.

5. The method of claim 1, further including the step of:
   curing the object after all of the prepreg fiber strips have been applied.

6. A method for placing prepreg fiber strips to build up an object, comprising the steps of:
   defining a three-dimensional shape to be fabricated, such shape having a volume;
   selecting a plurality of cross sections to define the object; the shape having a thickness which varies through the plurality of cross sections of the object, wherein each cross section has a cross sectional area;
   defining an area of a prepreg fiber strip through each cross section;
   selecting a plurality of points in each cross section as strip placement points, each strip placement point corresponding to a cross section of a prepreg fiber strip, wherein a sum of areas of the prepreg fiber strips for each cross section is equal to the cross sectional area for that cross section;
   grouping strip placement points into sets, each set having no more than one point from each cross section, wherein each set defines a placement location for one prepreg fiber strip; and
   placing prepreg fiber strips in the defined placement locations to build up the object.

7. The method of claim 6, wherein all of the prepreg fiber strips have the same width and the same thickness.

8. The method of claim 6, wherein a first prepreg fiber strip has a width less than a second prepreg fiber strip.

9. The method of claim 6, wherein at least one prepreg fiber strip has a length less than a length of the object.

10. The method of claim 6, further including the step of:
    curing the object after all of the prepreg fiber strips have been applied.

11. A method for applying prepreg fiber strips to form a portion of an airfoil having a first end and a second end, comprising the steps of:
    defining a plurality of cross sections of airfoil portion to be formed, wherein the airfoil has a leading surface and upper an lower surfaces defining an interior space, wherein each cross section has a cross sectional area defined by the leading, upper, and lower surfaces which does not include the interior space, wherein each cross section has an area less than or equal to that of the next cross section closer to the first end;
    defining an area of a prepreg fiber strip through each cross section;
    selecting a plurality of points in each cross section as strip placement points, each strip placement point corresponding to a cross section of a prepreg fiber strip, wherein a sum of areas of the prepreg fiber strips for each cross section is equal to the cross sectional area for that cross section;

grouping strip placement points into sets, each set having no more than one point from each cross section, wherein each set defines a placement location for one prepreg fiber strip; and placing prepreg fiber strips in the defined placement locations to build up the airfoil portion.

12. The method of claim 11, wherein the leading edge has a first thickness near the first end, and a second thickness greater than the first thickness near the second end, and the area for the upper and lower surfaces is larger in cross sections near the first end than for those near the second end, wherein a plurality of prepreg fiber strips that are placed in the upper and lower surfaces near the first end are placed in the leading edge near the second end.

13. The method of claim 11, wherein at least one prepreg fiber strip has a length less than a length of the airfoil portion.

14. The method of claim 11, further including the step of:

curing the airfoil portion after all of the prepreg fiber strips have been applied.

* * * * *